(12) United States Patent
Chun et al.

(10) Patent No.: US 6,564,057 B1
(45) Date of Patent: May 13, 2003

(54) SYSTEM AND METHOD FOR DETERMINING A HANDOFF TARGET BASE STATION IN A MOBILE COMMUNICATION SYSTEM

(75) Inventors: Kyong-Joon Chun, Seoul (KR);
Hyun-Woo Lee, Kyonggi-do (KR);
Kee-Sung Jung, Kyonggi-do (KR);
Tae-Ho Yu, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/309,235

(22) Filed: May 10, 1999

(30) Foreign Application Priority Data

May 8, 1998 (KR) .............................. 98-16454

(51) Int. Cl.[7] .................................................. H04Q 7/20
(52) U.S. Cl. ........................ 455/437; 455/440; 455/456
(58) Field of Search ................................ 455/436–444, 455/432, 456; 370/331

(56) References Cited

U.S. PATENT DOCUMENTS

| | | | | |
|---|---|---|---|---|
| 5,396,647 A | * | 3/1995 | Thompson | 455/440 |
| 5,857,155 A | * | 1/1999 | Hill | 455/456 |
| 6,021,123 A | * | 2/2000 | Mimura | 370/331 |
| 6,097,958 A | * | 8/2000 | Bergen | 455/456 |
| 6,151,502 A | * | 11/2000 | Padovani | 455/442 |

FOREIGN PATENT DOCUMENTS

RU 1120697 9/1994

* cited by examiner

*Primary Examiner*—Nguyen T. Vo
*Assistant Examiner*—James K Moore
(74) *Attorney, Agent, or Firm*—Dilworth & Barrese, LLP

(57) ABSTRACT

A system and method for determining a handoff target base station in a mobile communication system according to a direction of travel of a mobile station are provided. The mobile station measures strengths of pilot signals transmitted from base stations in proximity thereto and transmits information about the measured strengths to a base station controller (BSC). The BSC selects one of the base stations as the handoff target base station depending on the measured strength information and relative location of the mobile station with respect to each of the base stations. In an alternate embodiment, the mobile station selects the handoff target base station based on weights assigned to each base station according to a predicted direction of travel for the mobile station. The mobile station then selects one of the base stations as the handoff target base station depending upon the measured strengths and weights.

16 Claims, 8 Drawing Sheets

* WEIGHT : A>B>C>D

SYSTEM AND METHOD FOR DETERMINING A HANDOFF TARGET BASE STATION IN A MOBILE COMMUNICATION SYSTEM

PRIORITY

This application claims priority to an application entitled "Handoff Device and Method For Mobile Communication System" filed in the Korean Industrial Property Office on May 8, 1998 and assigned Serial No. 98-16454, the contents of which are hereby incorporated by reference.

BACKGROUND OF THE INVENTION

1. Field of the Invention

The present invention relates generally to mobile communications systems, and in particular, to a system and method for determining a handoff target base station in a mobile communication system.

2. Description of the Related Art

A code division multiple access (CDMA) mobile communication system performs handoff to continuously provide a call service, even when a mobile station travels from a present cell to an adjacent cell during the call service. There are two types of handoff: a soft handoff and a hard handoff. In the soft handoff, the mobile station maintains a call using both a channel assigned by a handoff target base station to which the mobile station is to be handed off and a channel assigned by the present base station in service. Meanwhile, one of the two channels, whose channel condition has a value lower than a threshold, is released. In the hard handoff, a channel assigned by the present base station in service is first released and then, a connection to an adjacent base station is attempted.

In general, a mobile station, during a call, monitors the strength of pilot signals transmitted by base stations adjacent to or in proximity to the mobile station. The mobile station stores the pilot signals having a relatively higher strength in a table. The base stations included in the table are referred to as "adjacent (or handoff candidate) base stations". As the mobile station travels, the pilot signals from the adjacent base stations vary in strength, and the mobile station changes the values stored in the table. The mobile station then provides information about the pilot signal strengths to the base station in service. Then, upon receipt of the pilot signal strength information, the base station in communication with the mobile station determines whether to perform a handoff operation. A base station having a pilot signal which has the highest strength, becomes a handoff target base station to which the mobile station is to be handed off. However, determining the handoff by simply measuring the strength of the received signal increases the frequency of the handoff operation resulting in an increase of a system load.

With reference to FIG. 1, there is shown a diagram illustrating a mobile communication system. A mobile communication network includes mobile switching center (MSC) 141 connected to multiple base station controllers (BSCs) 131–13n, each of which is connected to multiple base stations 121–12n. Mobile stations 111–11n belonging to one cell are wirelessly connected to corresponding base station 121 to provide a call service. Multiple base stations 121–12n are controlled by the BSC 131. The BSCs 131–13n are then controlled by the MSC 141. If the mobile station 111 attempts to communicate with a wire subscriber 161 belonging to a public switched telephone network (PSTN) 151, rather than with another mobile station belonging to the mobile communication network, the MSC 141 establishes a traffic channel by connecting the wire subscriber 161 to the mobile station 111 via the PSTN 151. Alternatively, it is also possible to unify the base stations 121–12n and the corresponding BSC 131 into one body.

A description will now be made to a conventional handoff operation performed by the mobile communication system of FIG. 1 with reference to FIG. 2. When a mobile station MS5, which is being presently serviced by a base station BS1, travels to a cell area CELL2 of an adjacent base station BS2, the handoff occurs at an overlapped area OL of a service area (or coverage) CELL1 of the base station BS1 and a service area CELL2 of the base station BS2 under the control of a BSC (not shown). That is, as the mobile station MS5 being serviced by the base station BS1 moves to the overlapped area OL, it measures a strength, T_add, of a signal received from the adjacent base station BS2 and provides the measured strength information to the BSC. The BSC then determines whether the base station BS2 can service the mobile station MS5, and provides the service to the mobile station MS5 via both the base station BS1 and the base station BS2 when the base station BS2 can provide the service.

If the strength of a signal received from the base station BS1 decreases below a threshold T_drop as the mobile station MS5 travels to the base station BS2, a radio link connected to the base station BS1 presently in service is released and the service is provided via a radio link connected to the base station BS2. Here, the release of the radio link does not occur as soon as the signal strength of the base station BS1 drops below the threshold T_drop, but the base station BS1 is dropped when the signal strength is continuously maintained below the threshold T_drop for a guard time $T\_{Tdrop}$.

In some cases, the mobile station MS5 may select a remote base station as the handoff target base station, instead of an adjacent base station or a base station which is the closest in proximity to the mobile station MS5. For example, referring to FIG. 3, when the mobile station MS5 travels from the base station BS1 to the base station BS2, the mobile station MS5 determines a handoff target base station, depending on strengths of pilot signals transmitted from the base stations. Here, for handoff, it is preferable for the mobile station MS5 to select a base station which is most adjacent thereto.

However, the signal strength of the nearest base station BS2 may be lower than a signal strength of a remote base station BS3 due to an obstacle such as a building. In this case, the mobile station MS5 may be handed off to the remote base station BS3 rather than the nearest base station BS2, depending on the signal strength. However, as the mobile station MS5 continues to travel, the channel condition is changed such that the signal strength of the presently connected base station BS3 decreases and becomes lower than the signal strength of the nearest base station BS2. Then, the mobile station MS5 performs a handoff again. In a worst case scenario, an abrupt drop in the signal strength of BS3 may cause the call service to be terminated, thereby disconnecting the call.

That is, when the signal strength of the base station BS3 is higher than T_add in an instant due to the physical surroundings of the mobile station MS5, the mobile station MS5 performs a handoff add process for adding the base station BS3 to an active set. However, in the next instant, when the signal strength of the base station BS3 decreases, the mobile station MS5 performs a handoff drop process to drop the base station BS3 from the active set. In this case, the control signals exchanged for the handoff may increase system load, and the base station BS3 added to the active set may unnecessarily assign a traffic channel to the mobile station MS5, thereby reducing channel resources.

SUMMARY OF THE INVENTION

It is, therefore, an object of the present invention to provide a handoff system and method for performing: handoff depending on strengths of signals received from base stations in proximity to a mobile station, and weights based on the relative location of the mobile station with respect to each of the base stations in proximity thereto.

It is another object of the present invention to provide a handoff system and method for performing handoff depending on the direction of travel of the mobile station.

It is still another object of the present invention to provide a handoff system and method for performing handoff depending on a traveling velocity of the mobile station.

To achieve these and other objects, a system and method for determining a handoff target base station in a mobile communication system according to a direction of travel of a mobile station are provided. The mobile station measures strengths of pilot signals transmitted from base stations in proximity thereto and transmits information about the measured strengths to a base station controller (BSC). The BSC selects one of the base stations as the handoff target base station depending on the measured strength information and relative location of the mobile station with respect to each of the base stations. Weights corresponding to each of the base stations are also taken into consideration to select the handoff target base station. The weights are determined by determining a direction of travel of the mobile station relative to each of the base stations, where the direction of travel is based upon the direction of movement of the mobile station.

DETAILED DESCRIPTION OF PREFERRED EMBODIMENTS

Preferred embodiments of the present invention will be described herein below with reference to the accompanying drawings. In the following description, well known constructions or functions are not described in detail so as not to obscure the present invention.

The present invention provides a system and method for determining a handoff target base station in a mobile communication system by detecting a location of a mobile station and applying weights to the pilot signals received from base stations in proximity to the mobile station. By doing so, it is possible to reduce the system load caused by the frequent handoff operation and also reduce a probability of call disconnection. Here, by detecting the location of the mobile station several times, it is possible to accurately determine a direction of travel of the mobile station. Further, for determining the traveling direction, the location of the mobile station can be traced by comparing the present location of the mobile station with the past locations of the mobile station.

Handoff methods according to the present invention will be now described with reference to FIGS. 4 through 7. In a mobile communication system according to the present invention, a mobile station measures strengths of pilot signals transmitted from respective base stations and provides the signal strength information to a base station controller (BSC). The BSC then selects the handoff target base station. Furthermore, the present invention applies weights to the respective adjacent (or handoff candidate) base stations to select the most suitable handoff target base station. The weights are preferably determined according to the relative location of the mobile station MS5 with respect to each of the handoff candidate base stations.

A. First Embodiment

Figure 1:
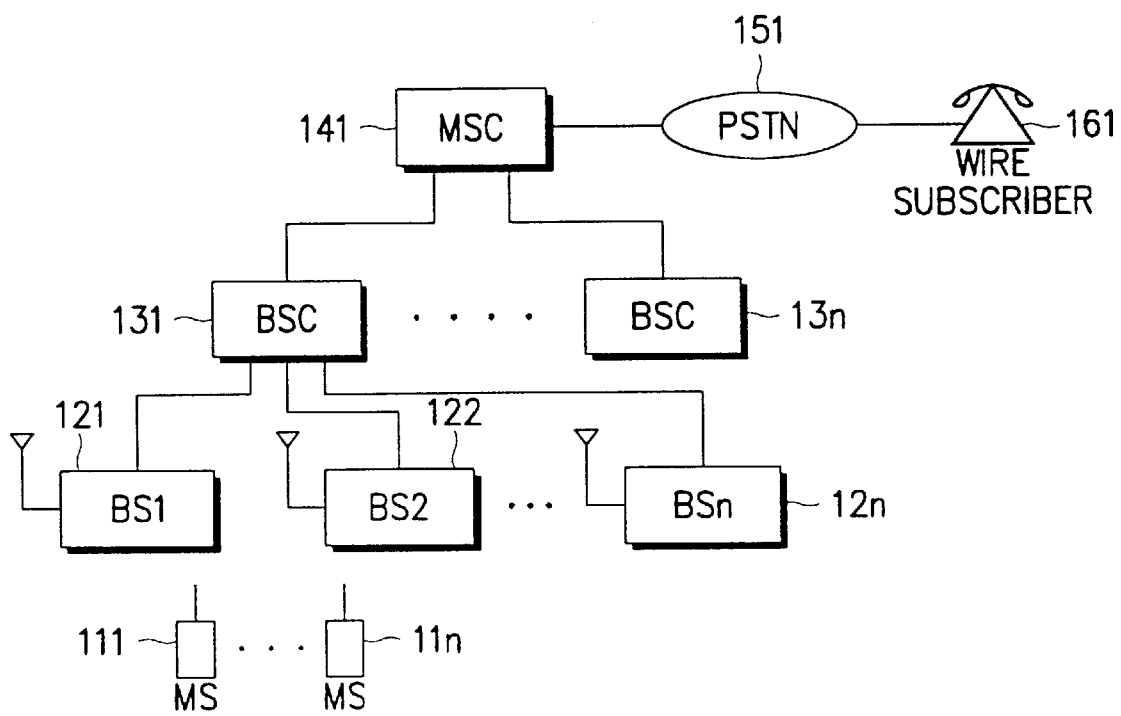
FIG. 1 is a block diagram illustrating a conventional mobile communication system.
Figure 2:
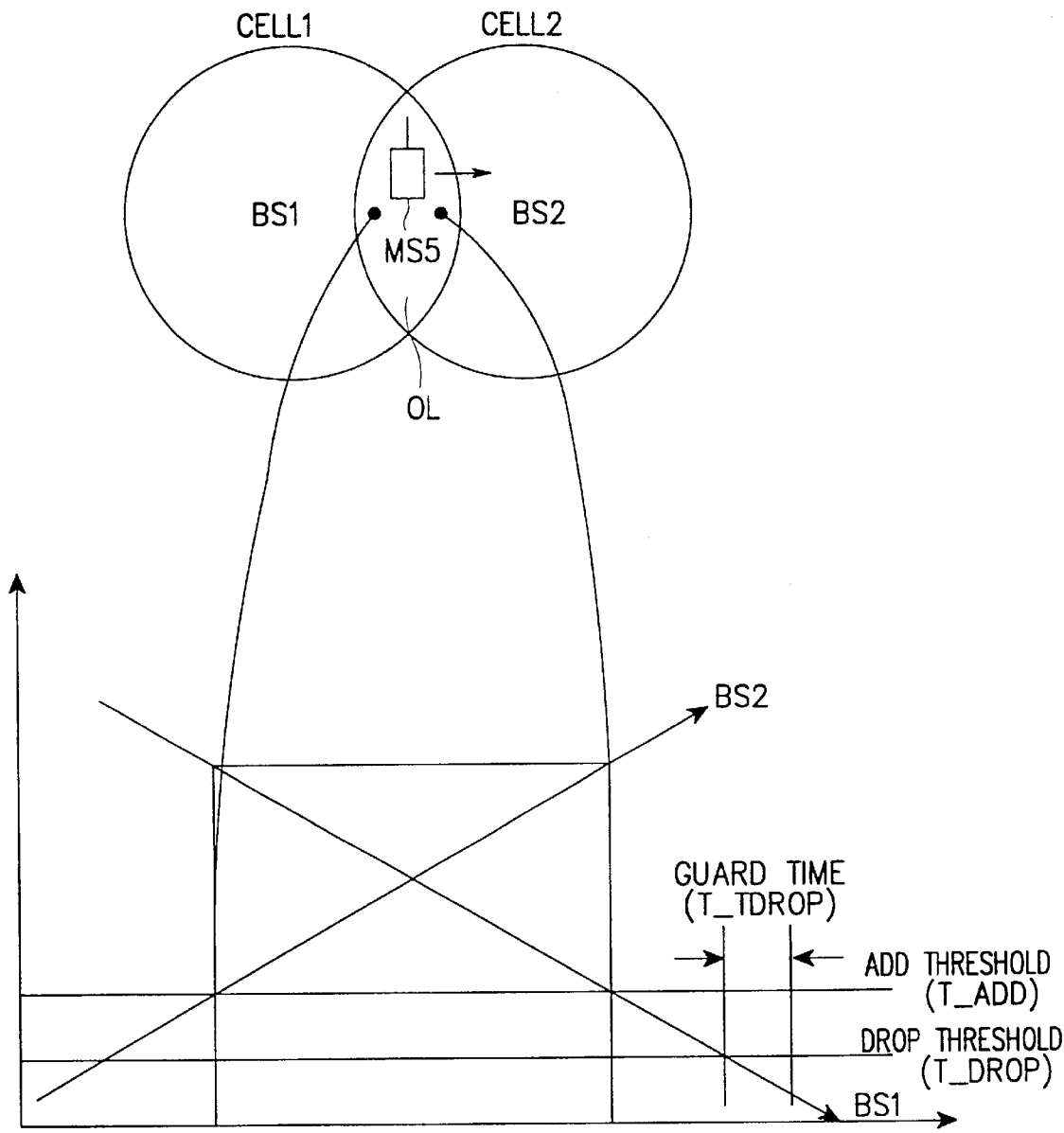
FIG. 2 is a diagram illustrating a prior art handoff operation in the mobile communication system of FIG. 1.
Figure 3:
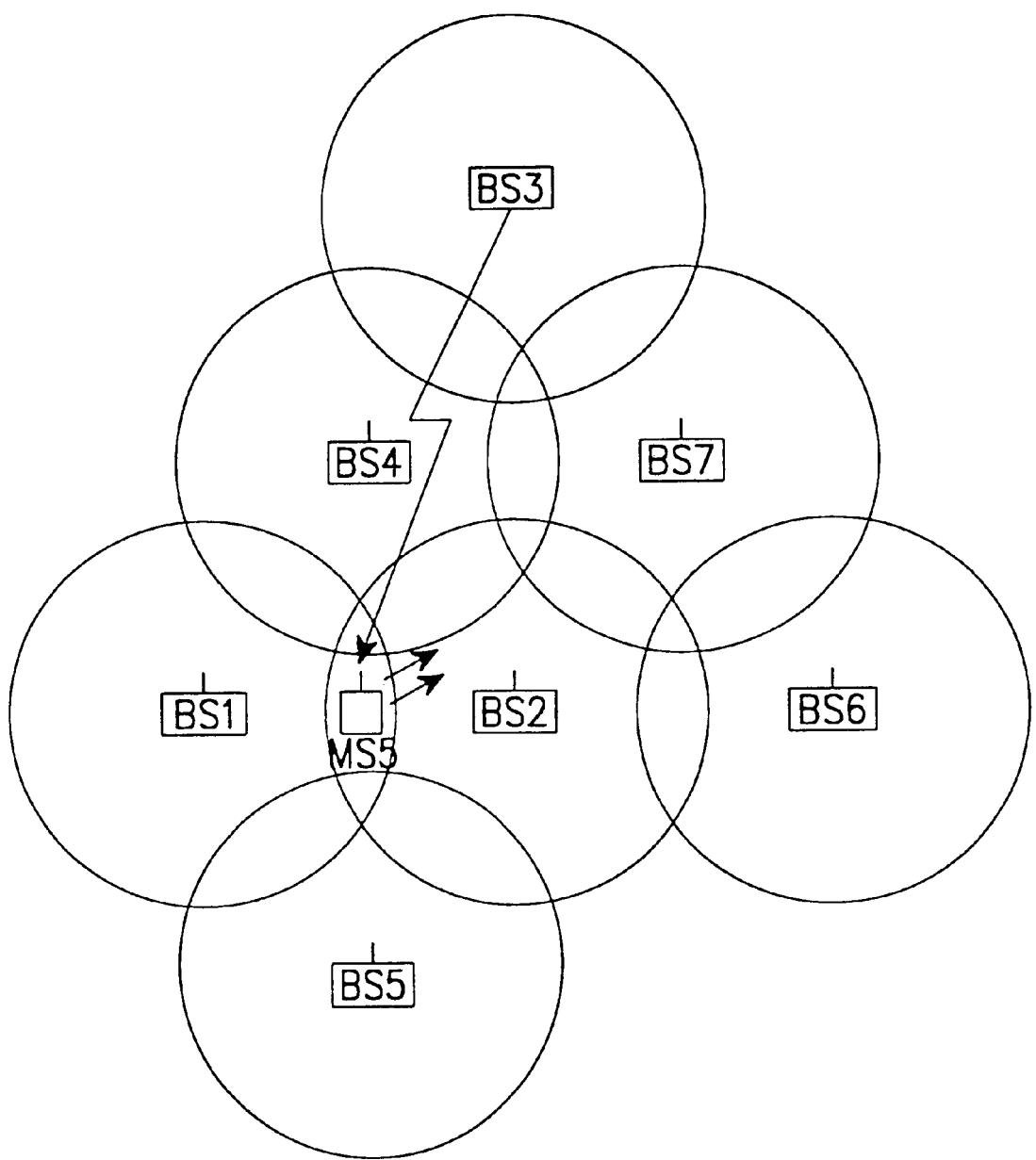
FIG. 3 is a diagram illustrating a prior art handoff operation where a base station is selected as a handoff target base station for having a signal having the greatest strength.
Figure 4:
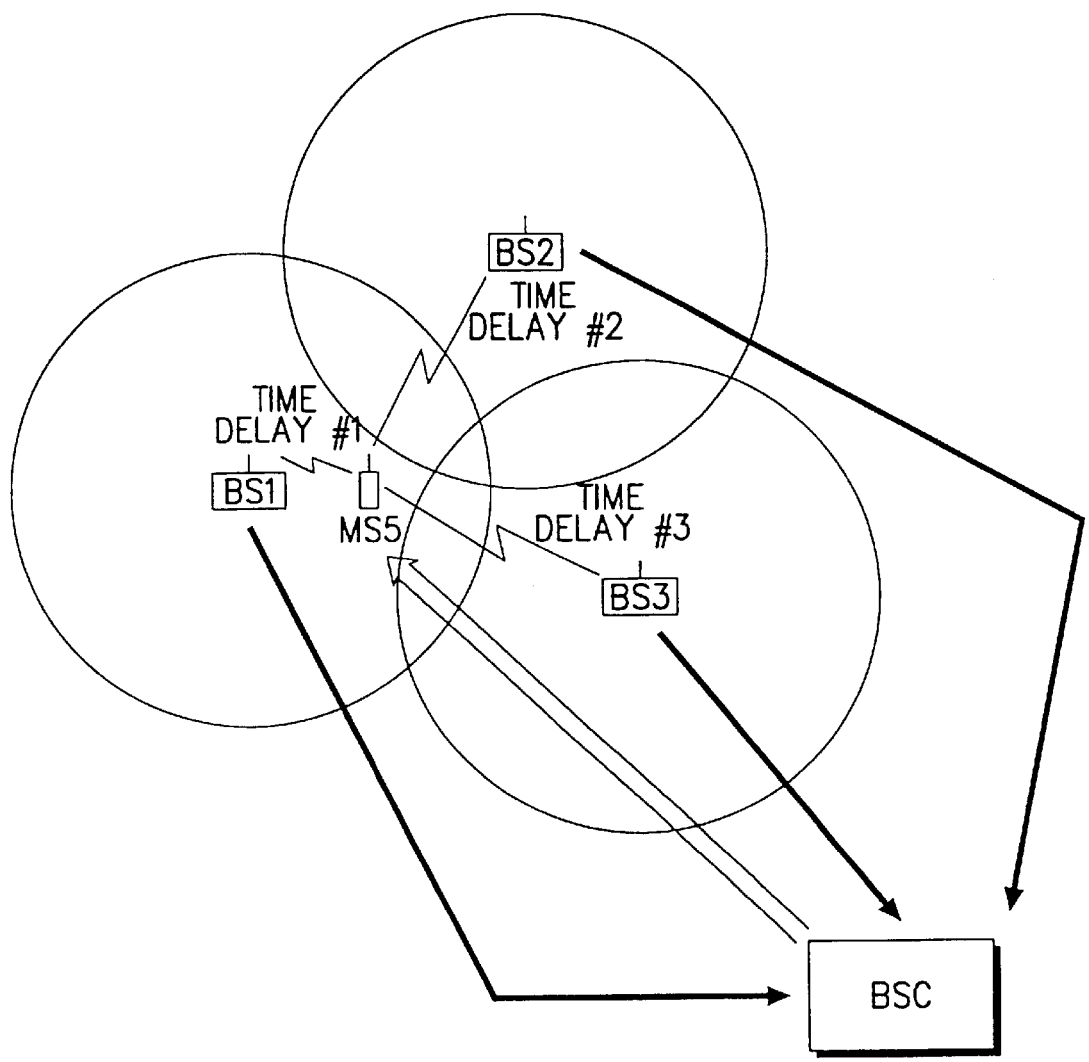
FIG. 4 is a diagram illustrating a handoff operation in a mobile communication system according to the present invention.

A description is now provided with respect to a method for applying weights to the adjacent base stations according to a first embodiment of the present invention. With reference to FIG. 4, a base station BS1 utilizes a technology for tracing a location of a mobile station MS5 during communication. This location tracing technology is disclosed in Korean Patent Application No. 38278/1998 having a common assignee. Alternatively, a mobile station having a GPS (Global Positioning System) receiver can provide the location information thereof to the base station. The present invention is not limited to utilization of such location tracing technologies.

For tracing the location of the mobile station MS5, a base station BS1 in communication with the mobile station MS5 transmits a location trace message. Upon receipt of a location trace acknowledge message from the mobile station MS5, the base station BS1 in service transmits to the BSC information required for location tracing, such as a transmit time of the location trace message and a receive time of the location trace acknowledge message. Preferably, transmission of the location trace message is performed periodically or according to a traffic channel condition. For example, the base station can transmit the location trace message upon receipt of a handoff request from the mobile station MS5. The BSC then provides an electronic serial number (ESN) of the mobile station MS5 to the adjacent (or handoff candidate) base stations to allow them to receive the signal from the mobile station MS5.

Upon receipt of the location trace message during communication, the mobile station M5 transmits the location trace acknowledge message at a high power level in an effort to have adjacent base stations BS2 and BS3 receive it, as well. Upon receipt of the location trace acknowledge message, the base stations transmit messages for location tracing to the BSC. The BSC then determines a traveling direction of the mobile station using information included in the messages received from the multiple base stations. The BSC then selects the handoff target base station according to the determination result.

The information included in messages for location tracing may include a receive time at which the base stations BS2 and BS3 have received the location trace acknowledge message. Also, the BSC analyzes information received from the base stations BS1, BS2, BS3 to determine the location of the mobile station, and applies different weights to the strengths of the respective pilot signals from the adjacent (or handoff candidate) base stations based on the determined location. That is, the base stations relatively closer to the mobile station are provided with higher weights, and the base stations relatively farther away from the mobile station are provided with lower weights.

In addition, the location information of the mobile station MS5, the weight information and the location information of the base stations BS1, BS2 and BS3 are transmitted to the mobile station MS5. It is contemplated that although the number of the base stations adjacent to or in proximity to the mobile station MS5 are limited to two in FIG. 4, there could be any number of adjacent base stations.

Figure 5:
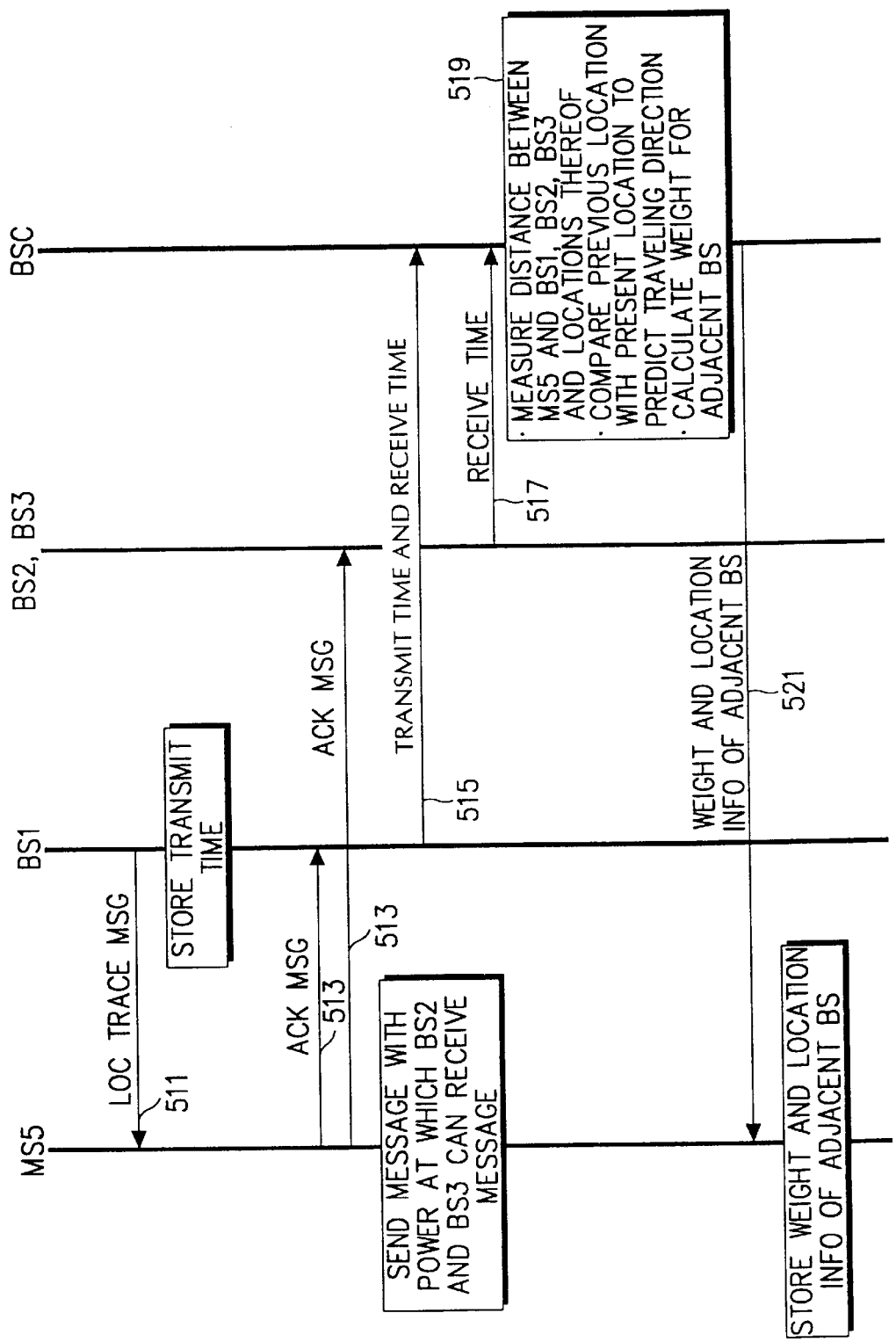
FIG. 5 is a timing diagram of the handoff operation of FIG. 4.

FIG. 5 is a timing diagram illustrating a handoff operation performed within the mobile communication configuration of FIG. 4. In the following description in conjunction with FIG. 5, it is assumed that the mobile station MS5 is traveling from the base station BS1 to the base station BS2. To detect the location of the mobile station MS5, the base station BS1 presently in communication with the mobile station MS5 transmits a location trace message to the mobile station MS5 in step 511. At the same time, the base station BS1 stores a transmit time of the location trace message and notifies the BSC of transmission of the location trace message.

The BSC then transmits ESN information of the mobile station MS5 to the adjacent base stations BS2 and BS3 and allows the base stations BS2 and BS3 to receive a location trace acknowledge message from the mobile station MS5. Then, the adjacent base stations BS2 and BS3 enable receivers for receiving the acknowledge message transmitted from the mobile station MS5. Upon receipt of the location trace message, the mobile station MS5 transmits in step 513 the location trace acknowledge message at a high transmission power so that the adjacent base stations BS2 and BS3 can receive the transmitted location trace acknowledge message, as well.

Upon receipt of the location trace acknowledge message, the base station BS1 transmits to the BSC a transmit time of the location trace message and a receive time of the location trace acknowledge message in step 515. Also, the base stations BS2 and BS3 transmit to the BSC the receive time of the location trace acknowledge message 10 in step 517. In step 519, the BSC then measures the distances between the mobile station MS5 and the respective base stations BS1–BS3 using the transmit time of the location trace message at the base station BS1 and the receive time of the location trace acknowledge message at the respective base stations BS1–BS3, in order to calculate the location of the mobile station MS5.

In the case where the location of the mobile station MS5 is periodically detected, the BSC compares the previous location of the mobile station MS5 with a present location of the mobile station MS5 to predict a direction of travel of the mobile station MS5. By predicting the traveling direction, it is possible to determine a base station corresponding to the vicinity of which the mobile station MS5 is moving towards. Based on the predicted traveling direction, a higher weight is applied to a base station associated with the vicinity of which the mobile station MS5 is moving towards, and a lower weight is applied to base stations from which the mobile station MS5 is moving away from, as described below with reference to FIG. 6.

Figure 6:
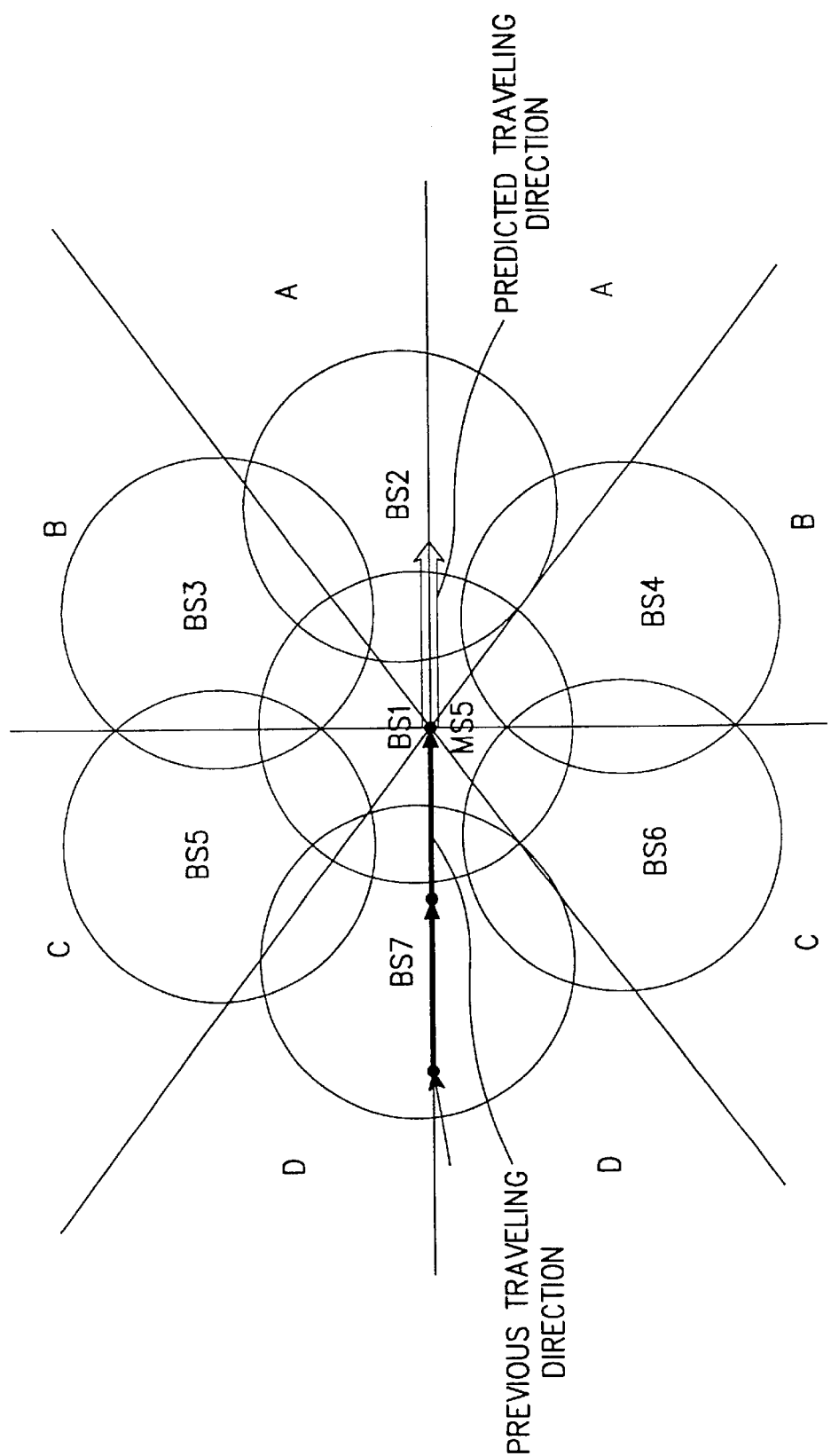
FIG. 6 is a diagram illustrating a method for applying weights to base stations in proximity to a mobile station according to a direction of travel of the mobile station.

Referring to FIG. 6 and taking into consideration the predicted traveling direction of the mobile station MS5, the surrounding area is divided into several zones with respect to the present location of the mobile station MS5 and then, appropriate weights are applied to the respective adjacent base stations BS2–BS7. In this example, as illustrated, the surrounding area is divided into 8 zones having a 45° angle with respect to a horizontal or vertical axis passing through the present location of the mobile station MS5.

Here, it is predicted that the mobile station MS5 will move to the base station BS2, as shown by the outlined arrow, by comparing the previous location with the present location of the mobile station MS5. In accordance with the prediction, different weights are applied to the respective adjacent base stations BS2–BS7. That is, the base station BS2 is provided with a highest weight A, the base stations BS3 and BS4 with a weight B which is lower than the weight A, the base stations BS5 and BS6 with a weight C which is lower than the weight B, and the base station BS7 with a weight D which is lower than the weight C.

In the meantime, since the BSC knows the locations of the base stations, it determines a handoff target base station using such calculated weight information of the respective adjacent base stations, the location information of the mobile station and the adjacent base stations, and the signal strengths of the adjacent base stations, and then assigns a traffic channel to the mobile station MS5 for communication with the determined handoff target base station, thereby performing the handoff. Moreover, in step 521 (FIG. 5), the BSC transmits the weight information and the location information of the adjacent base stations BS2–BS7 and the mobile station MS5 via the base station BS1 presently in service.

The mobile station MS5 then determines a base station to which it is to be handed off, by applying the weights to the strengths of the pilot signals from the adjacent base stations, and verifies again whether the determined base station is an appropriate handoff target base station, depending on its location and the locations of the adjacent base stations. In this manner, the mobile station can determine the most appropriate handoff target base station. Table 1 shows a method for determining a final handoff target base station.

| Adjacent BS | Signal Strength | Weight | Handoff Determination Value |
|---|---|---|---|
| BS3 | 77 | B(16) | 93 |
| BS2 | 75 | A(20) | 95 (Target Handoff) |
| BS4 | 74 | C(12) | 86 |
| BS1 | 75 | D(8) | 83 |
| ... | ... | ... | ... |

In Table 1, although strengths of the signals received from the base stations BS1–BS4 are almost equal to one another, the base station BS2 is determined as a final handoff target base station for having the highest weight provided by the BSC. That is, in Table 1, the base stations are arranged in the order of handoff determination value obtained by adding the weights to the received signal strengths, and the base station having the highest handoff determination value is selected as a handoff target base station, as shown by FIG. 7.

Figure 7:
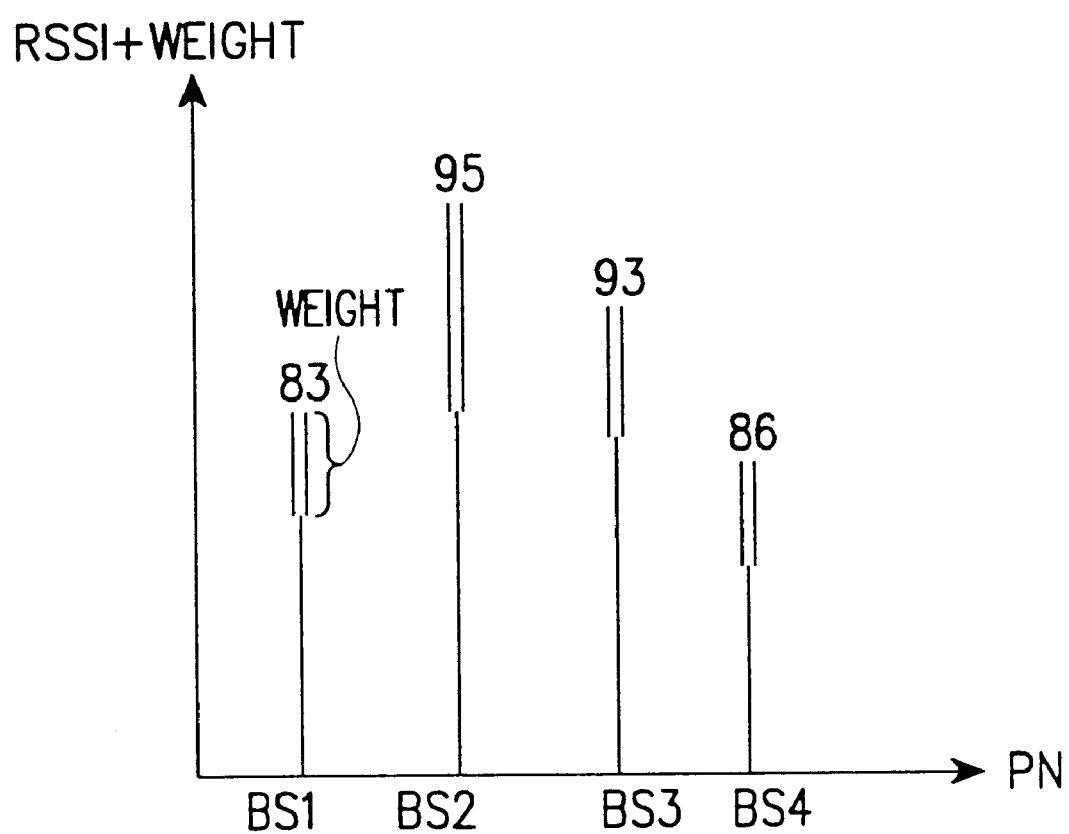
FIG. 7 is a graph illustrating adding weights to the received signal strengths corresponding to the base stations in proximity to the mobile station.

Referring to FIG. 7, an X-axis represents PN (Pseudo-random Noise) sequences used for dividing the base stations, and a Y-axis represents the handoff determination value of the received signal strength indication (RSSI) plus the weight. Here, the handoff target base station is the base station BS2, since it has the highest handoff determination value of 95.

However, even though the handoff target base station is selected in this manner, in the case where the adjacent base stations are walled in from the mobile station MS5 by building or other obstacles, the signal strength of a base station farther away can be higher than the handoff determination values of the adjacent base stations BS2–BS7. To prevent such an event, the BSC transmits the location information of the base stations adjacent to the mobile station MS5, together with the weight information of the adjacent base stations. Therefore, even though the farther base station is determined as the handoff target base station due to its high signal strength, the mobile station verifies the determination of the handoff target base station using the location information of the adjacent base stations, thereby selecting an optimal handoff target base station.

In this embodiment, a description has been made as to a method for determining the location information of the mobile station. However, in the event where the mobile station includes a GPS receiver and provides information about its location to the BSC via the base station in service, it is possible to simply detect the location of the mobile station without assistance from the adjacent base stations. In this embodiment, since the BSC knows the locations of the handoff candidate base stations, it can determine the handoff target base station by taking into consideration the location of the mobile station by applying a higher weight to the base station closest to the mobile station and a lower weight to the base station farthest from the mobile station using the location information transmitted from the mobile station and the strengths of the pilot signals from the adjacent base stations.

B. Second Embodiment

In this embodiment, the mobile station applies weights to the respective adjacent base stations using the location information of the respective base stations provided from a base station in service. Fundamentally, a base station knows its own location coordinate which it receives from a satellite via a global positioning system (GPS), and also knows location coordinates of other base stations, which are provided from the BSC or set during an initial system setup. The base station in service transmits to the mobile station the location information of itself and other base stations, and information about the adjacent base stations (e.g., PN offset information) via a paging channel or a sync channel.

By using the above information received from the base station, the mobile station can calculate a location coordinate $(X_i,Y_i)$ of the base station in service and location coordinates $(X_n,Y_n)$ of the adjacent base stations. That is, the mobile station can determine the adjacent base stations by analyzing PN offset values of the base stations from which the pilot signals are received from. In addition, the mobile station can determine its location in the same manner as the first embodiment or the conventional method. Upon receipt of the location information of the service base station and the adjacent base stations, the mobile station calculates relative distances between the base station presently in service and the respective base stations. The relative distance is used in selecting a base station closest to the mobile station, in the case where there are several base stations having the same weight.

The relative distance Dn is defined as $$Dn=\sqrt{(X_n-X_i)^2+(Y_n-Y_i)^2} \quad (1),$$

where a horizontal distance $Dx=X_n-X_i$ and a vertical distance $Dy=Y_n-Y_i$.

Also, it is possible to calculate angles (or directions) between a base station to which the mobile station belongs and the other base stations, using the location coordinates of the respective base stations. Dx and Dy represent the horizontal and vertical distances from the origin (0,0). By using these values, it is possible to calculate the relative distance and an angle between the present base station and a corresponding base station. That is, on the assumption that the present location of the mobile station is equal to the location of the base station in service, the distances and angles between the base station in service and the respective adjacent base stations are calculated. For example, if it is assumed that the base station presently in service has a location coordinate (2,2) and an adjacent base station has a location coordinate (0,0), the relative distance Dn becomes $2\sqrt{2}$ (since Dx=2 and Dy=2) from equation (1), and the angle therebetween becomes 45° from equation (2)

$$\theta=\tan^{-1}(Dx/Dy) \quad (2).$$

In addition, since the mobile station knows the weights to be applied to the respective adjacent base stations according to the angles, it applies the higher weight to the base station associated with a vicinity the mobile station is traveling towards and the lower weight to the base stations which are getting farther from the mobile station. Here, the traveling direction of the mobile station can be determined in the same manner as the first embodiment or can be directly received from the satellite via the GPS receiver.

Furthermore, when there are several base stations having the same weight, the mobile station performs handoff to the base station closest to the present base station using the relative distance Dn. In this embodiment, a description has been made as to a method for calculating the distances and angles (or directions) between the respective adjacent base stations on the assumption that the location of the mobile station is equal to the location of the service, base station. However, since the mobile station knows its own location as mentioned above, it can also calculate the distances and angles between the respective adjacent base stations by using its own location.

Figure 8:
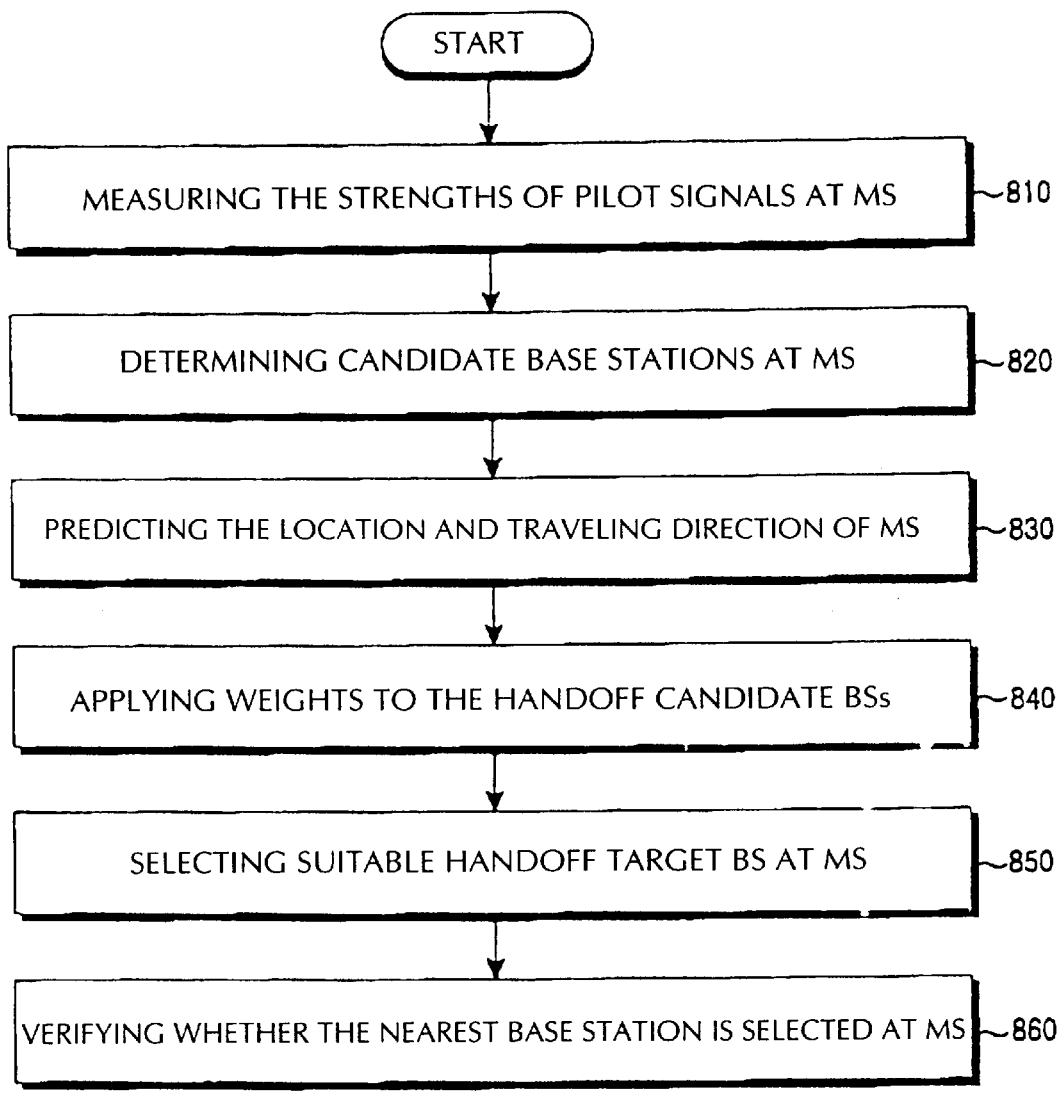
FIG. 8 is a flow chart illustrating a handoff operation according to the present invention.

FIG. 8 is a flow chart illustrating a handoff operation according to the present invention. The present invention will be summarized with reference to FIG. 8. In step 810, the handoff method according to the present invention entails the mobile station measuring the strengths of the pilot signals transmitted from the respective base stations. In step 820, the mobile station then determines the handoff candidate base stations according to the pilot signal strength measurements. Thereafter, the location and the traveling direction of the mobile station is predicted in step 830. In step 840, different weights are applied to the handoff candidate base stations in the two different methods. In a first method, the BSC predicts the location and direction of travel of the mobile station using various information (i.e., a transmit time of a location trace message and a receive time of a location trace acknowledge message) transmitted from the adjacent base stations including the service base station, applies weights to the respective handoff candidate base stations based on the predicted traveling direction, and transmits the weight information to the mobile station.

In a second method, the mobile station receives location information of the adjacent base stations, and applies the weights to the adjacent base stations according to its direction of travel using the received location information. After applying the weights to the adjacent base stations, the mobile station adds the corresponding weights to the strengths of the pilot signals from the adjacent base stations to select the most suitable handoff target base station in step 850.

In addition, in step 860, it is verified whether or not the selected base station is really an optimal handoff target base station in the following two different methods. In a first method, the mobile station can receive its own location information and the location information of the adjacent base stations from the BSC, and compares its own location with the locations of the adjacent base stations to determine whether the closest base station is selected. If it is determined that the base station selected using the weights is not the closest base station, the mobile station perceives misselection of the handoff target base station and performs the handoff procedure again.

In a second method, the mobile station calculates a relative distance Dn between the mobile station and the respective base stations on the assumption that its own location is equal to the location of the service base station, and verifies whether the selected base station is an optimal handoff target base station using the relative distance Dn. For example, if the relative distance of the base station selected using the weight is the shortest, the mobile station can verify that the handoff target base station has been correctly selected.

Furthermore, it is possible to know the traveling velocity, speed and distance of the mobile station from a detect time of the previous location and a detect time of the present location of the mobile station. The mobile station can be handed off to a base station having an appropriate cell radius according to the traveling velocity. When the mobile station travels at high speed, the small cell radius of the adjacent base station inevitably causes the frequent handoff. In this case, the handoff should be performed frequently at short intervals, increasing a probability of handoff fail and call disconnection. To prevent this, when the mobile station moves at high speed, a control right is handed off to the base station having a large cell radius to perform the stable handoff. Otherwise, when the mobile station moves at low speed, the control right is handed off to the closest base station. In addition, since the mobile communication system according to the present invention fundamentally detects the location of the mobile station, it is possible to provide a location trace service without a separate location updating process.

As described above, the conventional handoff is performed depending on only the signal strength. Therefore, when the strength of a signal from a base station far away from the mobile station is temporally high due to the surroundings, an improper handoff to that base station occurs. After a while, if the received signal strength is reduced, the handoff operation should be performed again. The frequent performance of the handoff operation increases system load, resulting in an increase in the call disconnection probability. However, the mobile communication system according to the present invention performs the handoff operation by taking into consideration the locations of the base stations and the weights of the adjacent base stations obtained by tracing the location of the mobile station, thereby increasing a reliability of the system and securing a stable handoff operation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for determining handoff of a mobile station to one of a plurality of base stations adjacent thereto, comprising the steps of:

measuring strengths of pilot signals from the adjacent base stations;

selecting a handoff target base station out of the adjacent base stations depending on the measured signal strengths and weights determined based on locations of the mobile station and the base stations; and calculating a relative distance between a base station in service and the adjacent base stations to verify whether the nearest base station is selected as the handoff target base station;

wherein the weights are applied to the adjacent base stations according to directions of the adjacent base stations based on a traveling direction of the mobile station, which is predicted according to movement of the mobile station.

2. The method as claimed in claim 1, wherein the directions of the base stations are calculated by:

$$\Theta = \tan^{-1}(Dx/Dy)$$

where $Dx = Xn - Xi$ and $Dy = Yn - Yi$ when a coordinate of the base station in service is $(Xi, Yi)$ and a coordinate of an adjacent base station is $(Xn, Yn)$.

3. The method as claimed in claim 1, wherein the mobile station receives its own coordinates through a global positioning system (GPS) to predict a traveling direction thereof.

4. The method as claimed in claim 1, wherein the handoff target base station is an adjacent base station having a highest handoff determination value determined by adding the corresponding weights to the strengths of the received pilot signals.

5. A method for determining handoff in a base station controller (BSC), comprising the steps of:

measuring, at a mobile station, strengths of pilot signals from multiple base stations and transmitting the measured strengths to the BSC;

predicting, at the BSC, a traveling direction of the mobile station;

selecting, at the BSC, one of the base stations as a handoff target base station depending on the measured strengths and weights determined based on location information of the mobile station and the base stations, and the traveling direction of the mobile station; and calculating a relative distance between a base station in service and adjacent base stations to verify whether the nearest base station is selected as the handoff target base station.

6. The method as claimed in claim 5, wherein the weights are applied to adjacent base stations according to directions of the base stations viewed in the traveling direction of the mobile station, the traveling direction being predicted according to movement of the mobile station.

7. The method as claimed in claim 6, wherein the step of predicting the traveling direction of the mobile station comprises the steps of:

transmitting, at a base station in service, a location trace message and providing a transmit time of the location trace message to the BSC;

upon receipt of the location trace message, transmitting, at the mobile station, an acknowledge message;

upon receipt of the acknowledge message, transmitting a receive time of the acknowledge message from the base station to the BSC; and predicting, at the BSC, a location and a traveling direction of the mobile station depending on the transmit time of the location trace message and the receive time of the acknowledge message.

8. The method as claimed in claim 5, wherein the handoff target base station is a base station having the highest handoff determination value determined by adding corresponding weights to the measured strengths of the received pilot signals.

9. A method for determining handoff in a BSC, comprising the steps of:

measuring, at a mobile station, strengths of pilot signals from multiple base stations and transmitting the measured strengths and location information of the mobile station to the BSC;

predicting, at the BSC, a traveling direction of the mobile station;

selecting, at the BSC, one of the base stations as a handoff target base station depending on the measured strengths and corresponding weights determined based on location information of the mobile station and the base stations, and the traveling direction of the mobile station; and calculating a relative distance between a base station in service and adjacent base stations to verify whether the nearest base station is selected as the handoff target base station.

10. The method as claimed in claim 9, wherein the mobile station receives its own coordinate through a GPS.

11. A method for determining handoff of a mobile station, comprising the steps of:

measuring, at a mobile station, strengths of pilot signals from base stations and transmitting an acknowledge message upon receipt of a location trace message;

upon receipt of the acknowledge message, transmitting handoff information from the base stations to a BSC;

predicting, at the BSC, a traveling direction of the mobile station based on the handoff information and transmitting weights applied to the base stations according to the predicted traveling direction to the mobile station; and selecting, at the mobile station, one of the adjacent base stations as a handoff target base station depending on the measured strengths and the weights.

12. The method as claimed in claim 11, wherein the handoff information includes a transmit time at which a base station in service has transmitted the location trace message and a receive time at which the adjacent base stations have received the acknowledge message.

13. The method as claimed in claim 11, wherein the handoff target base station is a base station having the highest handoff determination value determined by adding corresponding weights to the measured strengths of the received pilot signals.

14. A system for determining handoff in a mobile communication system, comprising:

a mobile station for measuring strengths of pilot signals from base stations adjacent thereto, transmitting an acknowledge message to the base stations upon receipt of a location trace message, and selecting one of the adjacent base stations as a handoff target base station depending on measured strengths and weights; and a BSC for receiving handoff information from the base stations, predicting a traveling direction of the mobile station based on the handoff information, and transmitting the weights applied to the base stations according to the predicted traveling direction to the mobile station.

15. The system as claimed in claim 14, wherein the weights are applied to the adjacent base stations according to directions of the adjacent base stations based on a traveling direction of the mobile station, the traveling direction being predicted according to movement of the mobile station.

16. The system as claimed in claim 14, wherein the handoff target base station is a base station having the highest handoff determination value determined by adding corresponding weights to the measured strengths of the received pilot signals.

* * * * *